United States Patent [19]

Kläui et al.

[11] 3,922,368

[45] Nov. 25, 1975

[54] CROCETIN DIESTERS

[75] Inventors: Heinrich Kläui, Riehen; Ulrich Manz; Norbert Rigassi, Arlesheim; Gottlieb Ryser, Basel; Ulrich Schwieter, Reinach, all of Switzerland

[73] Assignee: Hoffmann-La Roche Inc., Nutley, N.J.

[22] Filed: July 2, 1973

[21] Appl. No.: 375,556

[30] Foreign Application Priority Data
Oct 31, 1969 Switzerland.................. 16244/69

Related U.S. Application Data

[62] Division of Ser. No. 78,911, Oct. 7, 1970, abandoned.

[52] U.S. Cl.............................. 426/540; 260/485 R
[51] Int. Cl.[2].......................................... A23L 1/27
[58] Field of Search................... 426/177, 250, 540; 260/485 R

[56] References Cited
UNITED STATES PATENTS

| | | | |
|---|---|---|---|
| 2,535,538 | 12/1950 | Koch.................................. | 426/177 |
| 2,559,411 | 7/1951 | Drew .................................. | 426/177 |
| 2,686,722 | 8/1954 | Goldstein........................... | 426/177 |
| 2,943,943 | 7/1960 | Keller ................................. | 426/177 |

FOREIGN PATENTS OR APPLICATIONS 221,269   7/1957   Australia............................ 260/485

Primary Examiner—Jeanette M. Hunter
Attorney, Agent, or Firm—Samuel L. Welt; Jon S. Saxe; Richard A. Gaither

[57] ABSTRACT

Crocetin diesters useful as coloring agents and water dispersible coloring compositions containing crocetin diesters.

1 Claim, No Drawings

CROCETIN DIESTERS

This is a division of application Ser. No. 78,911, filed Oct. 7, 1970, now abaondoned.

BACKGROUND OF THE INVENTION

Of the dyes of natural or synthetic origin suitable for coloring foodstuffs, β-carotene and the apocarotenals and keto compounds such as canthaxanthin derived from this natural substance have proved to be useful. However, various disadvantages set a limit to the general use of these dyes. The tints achievable with these dyes lie within a relatively narrow range extending from yellow-orange to yellow-red. Pure yellow shades such as are desired, for example, for lemon and grapefruit juice drinks, vanilla ice, yogurt, caramels, cream fillings, syrups, preserves, pudding powders, soup powders, lemonade powders, mayonnaise, etc. cannot be achieved with the named carotenoids.

It is known that lower members of polyene compounds such as crocetin are colored pure yellow. Crocetin as the free dicarboxylic acid is present as a trace carotenoid in a few plants. The carotenoid is mainly found as the digentobiocide (crocin) (saffron). However, because of its low solubilility or dispersibility the compound can only be used to a limited extent to color foods. The commercial manufacture of corresponding water-soluble preparations also meets with difficulties for the same reason.

SUMMARY OF THE INVENTION

In accordance with this invention it has been found that diesters of crocetin having the formula

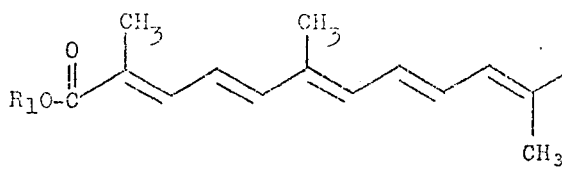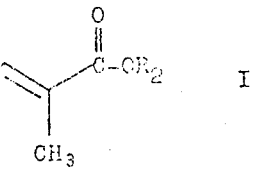 I wherein $R_1$ and $R_2$ are alkyl containing together from 16 to 40 carbon atoms can be prepared in water dispersible compositions which impart a uniform yellow shade to foodstuffs.

The water dispersible compositions of this invention are composed of at least one crocetin diester of the formula I and an edible emulsifier. These compositions are prepared by dissolving one or more crocetin diesters of the formula I and an edible emulsifier in a volatile organic solvent or in a mixture containing a volatile organic solvent and water and then removing the organic solvent. If, upon removal of the organic solvent, the resulting composition is a dry residue, the residue can be optionally dispersed in water.

As crocetin diesters for use in the compositions of this invention, the following are preferred:
di-n-decyl ester of crocetin;
di-n-dodecyl ester of crocetin; and
di-n-hexadecyl ester of crocetin

DETAILED DESCRIPTION

The term "halogen" as used throughout the specification designates all four halogens, i.e., chlorine, fluorine, bromine and iodine. The term "lower alkyl" designates alkyl groups containing from 1 to 7 carbon atoms such as methyl, ethyl, propyl, isopropyl, etc. The term "lower alkoxy" designates alkoxy substituents containing from 1 to 7 carbon atoms such as methoxy, ethoxy, propoxy, isopropoxy, etc. The term "higher fatty acids" includes aliphatic mono-basic acids derived from hydrocarbons containing e.g. from 12 to 20 carbon atoms which include myristic acid, palmitic acid, stearic acid and oleic acid. The term "higher alcohols" as utilized throughout the specification includes mono-hydroxy alcohols containing e.g. from 12 to 20 carbon atoms such as lauryl alcohol, myristyl alcohol, cetyl alcohol, etc.

Among the esters of formula I which can be utilized in accordance with this invention are those esters where $R_1$ and $R_2$ signify the same or different alkyl groups. However, the preferred crocetin diesters of formula I are those esters of the formula I wherein $R_1$ and $R_2$ designate the same alkyl group.

In preparing the water dispersible carotenoid preparations of this invention, at least one of the crocetin esters of formula I above and an emulsifier is dissolved in a soluble organic carotenoid solvent. In preparing this solution, any conventional edible emulsifier can be utilized. Among the preferred emulsifiers are included esters of mono- and di- glycerides with aliphatic polybasic carboxylic acids such as tartaric acid or citric acid. Another preferred edible emulsifier which can be utilized in accordance with this invention are the esters of higher alcohols with hydroxy aliphatic carboxylic acids such as stearyl lactate. A particularly preferred edible emulsifier which can be utilized in accordance with this invention is a salt of a higher fatty acid ester of ascorbic acid. This salt can also be formed in situ by the addition to the solution of a mixture of the higher fatty acid ester of ascorbic acid with a base.

As esters of ascorbic acid with higher fatty acids, e.g. acids having from 12 to 20 carbon atoms, i.e., esters with myristic acid, palmitic acid and stearic acid, are generally preferred. The commercially available palmitoyl ascorbate is particularly preferred in the formation of the water dispersible crocetin diester preparations.

In forming the salt, any conventional base can be utilized. Among the preferred bases are the alkali metal hydroxides such as sodium hydroxide and potassium hydroxide. Other preferred bases which can be utilized include sodium carbonates and amino acids. The use of amino acids such as arginine and lysine are generally preferred since these acids, besides acting as a base, aid in preventing crystallization.

In preparing the solution containing the edible emulsifier and at least one crocetin ester of the formula I above, the emulsifier is incorporated into the solution in a weight of about at least 0.1 times the weight of the crocetin ester of formula I. Generally, it is preferred to incorporate the edible emulsifier in a weight of about 0.3 times to about 10 times the weight of the crocetin ester.

In preparing the solution containing at least one of the crocetin esters of formula I above and the edible emulsifier, any conventional volatile organic carotenoid solvent, especially such solvents which are readily evaporated or steam distilled, can be utilized. Among the preferred organic carotenoid solvents are included the halogenated hydrocarbon solvents such as chloroform, carbon tetrachloride, methylene chloride, and trichloroethylene; the two first-named materials being especially preferred. Among the other good solvents for carotenoids, which can be employed in accordance with this invention, are included benzene and carbon disulfide.

In preparing the solution containing the diester of formula I, it may be desirable to incorporate other materials such as antioxidants, crystallization inhibiting agents, preservatives, solubilizing agents, etc.

Although the tendency of the crocetin diesters of formula I to crystallize from the solution during evaporation of the organic volatile solvent is itself slight, it may be desirable to add a crystallization inhibiting substance to further reduce this tendency. If desired, any of the conventional crystallization-inhibiting substances can be utilized in accordance with this invention. Among the preferred crystallization-inhibiting substances are included lecithin, fatty acids and fatty esters, particularly vegetable oils such as arachis oil, etc. If a basic salt of a higher fatty acid ester of ascorbic acid wherein the base is a basic amino acid such as arginine or lysine is utilized as the emulsifier, the basic amino acid, besides serving as part of the emulsifier, also provides crystallization inhibiting action.

If desired, the emulsifier such as the higher fatty acid esters of ascorbic acid or salts thereof can be partially replaced in the solution containing the crocetin diester of formula I, if desired, by solubilized agents. Any conventional solubilizing agent can be utilized, if desired, in accordance with this invention. Among the preferred solubilizing agents are included tocopherol sodium phosphate, sodium taurocholate, salts of p-aminobenzoic acid. If desired, a mixture of solubilizers can be utilized. The use of these solubilizers in preparing the solution is optional. However, the addition of a solubilizer such as tocopherol sodium phosphate permits manufacture of particularly weak opalescent aqueous solutions and simultaneously permits the total amount of solubilizer (based upon the crocetin ester) to be reduced.

If desired, an antioxidant can be added to the solution containing the emulsifier and crocetin diester of formula I above. The ascorbyl fatty acid ester, besides providing activity as an emulsifier, also provides protection against oxidation. However, if desired, other antioxidants can be added to the solution. Any conventional antioxidant can be utilized in preparing the solution in accordance with this invention. Among the preferred antioxidants are the conventional phenolic antioxidants. Among the antioxidants which are particularly preferred are tocopherol and nor-dihydroguaiaretic acid (NDGA).

In a preferred embodiment of the process for the production of the novel water-dispersible carotenoid preparations, the solution containing at least one of the crocetin esters of formula I above and the emulsifer and, if desired, the conventional additives such as crystallization-inhibiting substances, antioxidants and solubilizers, is concentrated to dryness. After the volatile organic solvent has been removed, the dry residue can be then dispersed in the water. On the other hand, a water dispersion of the crocetin diester of formula I can be prepared by dissolving at least one of the crocetin diesters of formula I above and the edible emulsifier in the volatile organic carotenoid solvent. This solution which may contain a soluble antioxidant, crystallization-inhibiting agent, solubilizer in addition to the crocetin diester of formula I above and the edible emulsifier, can then be distributed in water. After distribution, the volatile solvent is evaporated from the aqueous mixture thereby producing an aqueous dispersion containing at least one of the diesters of formula I above.

If desired, a preserving or stabilizing agent can be added to the aqueous phase before or after the evaporation of the organic solvent. Any of the conventional preserving or stabilizing agents can be utilized in accordance with this invention. Among the preferred preservatives or stabilizers are included sucrose, glucose invert sugar, ascorbic acid, sorbic acid, alkali metal bisulfites, etc.

In mineral water or hard water which has a high calcium content, there is present the danger of precipitation of the emulsifier due to the formation of the relatively insoluble calcium salt of the emulsifier such as the calcium salt of the higher fatty acid esters of ascorbic acid. This precipitation can be minimized when an aqueous solution containing a swellable colloid is added to the solution of the crocetin diester and emulsifier in the organic carotenoid solvent. Any conventional swellable colloid can be utilized in accordance with this invention. Among the preferred swellable colloids are included gelatin, dextrin, sucrose esters of higher fatty acids, i.e., sucrose oleate, gum arabic, tragacanth, pectin, etc. Complex formers such as ethylenediaminetetraacetic acid (EDTA, as the disodium salt) also can be utilized to prevent the precipitation of the emulsifier in mineral water or in hard water containing a high calcium content.

Instead of the usual gelatin (with higher, medium or low gelling power, i.e., Bloom number), there can also be employed a partially degraded gelatin. This can, for example, be obtained by treatment of an aqueous gelatin solution with papain at 38°C. for about 10 minutes or with acids such as tartaric acid, citric acid, ascorbic acid, etc. This treatment does not substantially reduce the protective colloid action, but has the advantage that the preparation is already dispersible in cold water. When preparing a water dispersible composition of this invention utilizing a swellable colloid, it is generally preferred to incorporate the colloid in an amount of from about 2 to 20 times the weight of the crocetin diester of formula I, with an amount of from about 2 to 5 times the weight of the crocetin diester of formula I being preferred.

When the solution containing the crocetin diester of formula I above and the edible emulsifier in a volatile organic carotenoid solvent is mixed with water, the cartotenoid solvent phase can be expediently mechanically homogenized before concentration. This can be carried out by conventional means utilizing conventional mechanical homogenizers such as in fastrunning rotors or in pressure homogenizers such as are usual in the milk industry. The volume of the carotenoid solvent phase should preferably not exceed that of the water phase in order that the emulsion obtained does not become too viscous and thereby difficult to homogenize The aqueous crocetin diester preparations containing the swellable colloid can be converted into dry products which, because of their far-reaching compatibility with hard water and other aqueous solutions, their stability and good solubility, are particularly preferred. This conversion is effected, for example, in a vacuum drying cupboard, by spray- or roller-drying, by freeze-drying, possibly after concentration in a thin layer evaporator.

If desired, a plasticizer can be added to the crocetin ester preparation at any time prior to its conversion into a dry product. The advantage of adding the plasticizer is that it inhibits the occurrence of gaps in the colloid layer. Any conventional edible plasticizer can be utilized. Among the conventional edible plasticizers which may be utilized are included various sugars such as glucose, sucrose, invert sugar, etc.

In the manner described above, there are obtained dry, water dispersible dye concentrates with at least 10% by weight of the carotenoid of formula I above.

In coloring foodstuffs, the composition containing the compounds of formula I above would be added to the foodstuff in an amount sufficient to impart a color to the material. Generally, it is preferred that the foodstuff contain from about 2 ppm to about 50 ppm of the compound of formula I or mixtures thereof.

The water dispersion dry concentrates which contain at least 10% by weight of the compound of formula I or mixtures thereof are suitable for direct yellow-coloration of solutions, for example, water or fruit juices.

The dry crocetin diester preparations prepared in accordance with this invention are dispersible in water and form homogeneous yellow-colored solutions which are translucent in thin layer. The product containing the swellable colloids are, depending upon the type of swellable colloid used, already dispersible in cold or in moderately warm water (about 35°C.). For use, the products containing at least one of the compounds of formula I above produced in accordance with the process of this invention can be expediently predissolved in at least a 10-fold amount of water, if need be by heating up to about 85°C. and thereupon, if desired, still further diluted. In this form, they are suitable for coloring fruit drinks such as, for example, lemon and grapefruit juice drinks, ices such as vanilla ice, yogurt; confectionery such as caramels and cream fillings; syrups, preserves, mayonnaise and the like. In contrast to many azo dyes, the novel crocetin diester preparations are not decomposed by ascorbic acid, which, for example, is naturally contained in fruit juices, preserves and the like. On the contrary, the aqueous dispersions of the crocetin diesters prepared in accordance with this invention are stabilized by the addition of ascorbic acid.

For particular applications, the preparation can, however, also be employed in the dry form, for example, for the coloring of pudding powder, soup powder, lemonade powder and the like.

The invention is also directed to novel crocetin diesters in which the alcoholic ester moieties represent alkyl groups with 10 to 14 carbon atoms each. These crocetin diesters can be obtained in accordance with the invention in such a manner that 4,9-dimethyl-dodeca-3,4,6,8,10-pentaene-1,12-dial ($C_{14}$-ene-dialdehyde) is condensed with a phosphorane of the formula

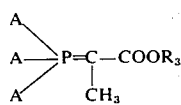   II wherein $R_3$ is alkyl containing 10 to 14 carbon atoms and A is phenyl, lower alkylsubstituted phenyl and lower alkoxy-substituted phenyl The phosphoranes of formula II above are prepared by condensing an ester of the formula

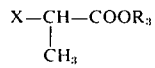   III wherein X is a halogen and $R_3$ is as above with a phosphine of the formula

   IV wherein A is as above
followed by treatment with a hydrogen halide binding agent. This reaction is carried out in an inert organic solvent. Any conventional inert organic solvent can be utilized. In carrying out this reaction any conventional base can be utilized as the hydrogen halide binding agent with sodium alcoholates such as sodium ethanolate being preferred.

Thus by reacting α-bromopropionic acid n-dodecyl ester with triphenylphosphine there is obtained (α-carbo-n-dodecyloxyethyl)-triphenylphosphonium bromide, the methylene chloride solution of which gives (α-carbo-n-dodecyloxy-ethylidene)-triphenyl phosphorane and sodium bromide on treating with the equivalent amount of 2N sodium methylate solution. The isolation of the phosphoranes of formula II is not necessary for the process in accordance with the invention. On the contrary, the reaction mixtures obtainable according to the process described, which contain the phosphoranes dissolved or in suspension, can be used directly.

In accordance with the invention, in the condensation step the $C_{14}$-ene-dialdehyde is reacted with the triphenylphosphorane of formula II and the addition product formed is converted into the polyene dicarboxylic acid ester while splitting off triphenylphosphine oxide. In this reaction two moles of the phosphorane of formula II are reacted with one mole of the $C_{14}$-ene-dialdehyde. Equivalent amounts of the components or an excess of the phosphorane of formula II can be used for the reaction. The reaction is carried out in a conventional inert solvent such as diethyl ether, petroleum ether, benzene, methylene chloride, dioxane or tetrahydrofuran, etc. In carrying out this reaction temperature and pressure are not critical. The components can be advantageously mixed at room temperature or at elevated temperature. Generally it is preferred to replace the overlying air with an inert gas such as, for example, nitrogen. The condensation is effected spontaneously on the addition of a solution of the $C_{14}$-ene-dialdehyde to a solution of the phosphorane, for example, (α-carbo-n-dodecyloxyethylidene)triphenylphosphorane. Depending on the choice of solvent, the condensation products formed remain in solution or they precipitate.

In a preferred embodiment of the condensation, methylene chloride (in which both the starting products and the resulting condensation products are soluble) is used as the solvent. The condensation products gradually break down at room temperature into the polyene dicarboxylic acid ester and the corresponding triphenylphosphine oxide. This reaction is accelerated by heating. The decomposition proceeds, for example, very readily by heating the reaction mixture to about 40°–50°C. for several hours, preferably in methylene chloride solution. The isolation of the polyene dicarboxylic acid esters obtained can, for example, be effected in such a manner that the by products are removed by shaking out with water, the organic phase is subsequently dried and concentrated. The dicarboxylic acid esters can then be separated from the resulting triphenylphosphine oxide by recrystallizing from ethanol; for this purpose, a partition between immiscible solvents or a chromatographic separation can also be used. Another advantageous working up of the polyene dicarboxylic acid esters obtained consists in treating the reaction solution with a large amount of ethanol or methanol, whereby the dicarboxylic acid esters precipitate in crystalline form while by-products remain in solution.

If instead of the above-mentioned α-halopropionic ester there are employed two or more α-halopropionic acid esters wherein the alcoholic ester moieties represent alkyl residues having chain lengths different from each other, one proceeds in the same manner to mixed (asymmetric) crocetin diesters or to mixtures of crocetin diesters which likewise can be used for the manufacture of the crocetin ester preparations in accordance with the invention. For example, a mixture of α-bromopropionic acid n-butyl ester and α-bromopropionic acid n-eicosyl ester, a mixture of α-bromopropionic acid ethyl ester and α-bromopropionic acid n-hexadecyl ester, etc. can be employed. In this case there are obtained the corresponding asymmetric crocetin esters or mixtures of such esters with symmetric crocetin esters.

The following examples are illustrative but not limitative of the invention. All temperatures are in degrees Centigrade.

EXAMPLE 1

1 g. of crocetin di-n-dodecyl ester is dissolved in 20 ml. of chloroform and, together with 100 mg. of dl-α-tocopherol and 600 mg. of palmitoyl ascorbate, introduced into a solution of 3 g. of gelatin, 2 g. of sucrose and 100 mg. of sodium carbonate in 30 ml. of water and homogenized. The yellow chloroform- containing gelatin emulsion is subsequently freed from chloroform and converted into a dry form.

200 mg. of color preparation prepared above which contains about 25mg. of crocetin di-n-dodecyl ester are dissolved in 20 ml. of warm water and added to the raw materials such as cream, milk, sugar, gelatin and aroma substances necessary for 1 liter of ice cream. There is obtained a lemon-yellow ice cream, optionally with vanilla or lemon aroma.

EXAMPLE 2

1 g. of crocetin Di-n-dodecyl ester is dissolved in 20 ml. of chloroform and, together with 100 mg. of dl-α-toropherol, 400 mg. of arachis oil and 600 mg. of palmitoyl ascorbate, introduced into a solution of 3 g. of gelatin, 2 g. of sucrose and 100 mg. of soda in 30 ml. of water and homogenized. The gelatin emulsion obtained is further processed to a dry powder according to the procedure of Example 1.

EXAMPLE 3

200 mg. of color preparation which contains about 25 mg. of crocetin di-n-hexadecyl ester (manufactured by the procedure of Example 1 or 2) is dissolved in 10 ml. of warm water and homogenized in 50 g. of grapefruit concentrate. After the addition of citric acid and sugar syrup, the colored grapefruit concentrate is diluted to 5 liters with carbonic acid-containing water and filled into bottles with stirrup closure.

EXAMPLE 4

1 g. of crocetin di-n-dodecyl ester is dissolved in 10 ml. of chloroform and, together with 100 mg. of dl-α-tocopherol and 1 g. of palmitoyl ascorbate, introduced into a warm solution of 14g. of invert sugar syrup (65Be), 3 g. of sucrose and 200 mg. of sodium carbonate and homogenized. The emulsion is freed from the chloroform by evaporation. There results a viscous syrup with a content of approximately 5% by weight crocetin di-n-dodecyl ester.

400 mg. of this color preparation, containing ca 20 mg. of crocetin di-n-dodecyl ester, are dissolved in ca 5 ml. of water and added to 1 kg. of bonbon mixture towards the end of the cooking process or during the subsequent working up and homogeneously worked in. Lemon-yellow hard or soft caramels are thereby obtained.

EXAMPLE 5

1 g. of crocetin di-n-dodecyl ester is dissolved in 10 ml. of chloroform and, together with 100 mg. of dl-α-tocopherol, 400 g. of arachis oil and 1 g. of palmitoyl ascorbate, introduced into a warm solution of 14 g. of invert sugar syrup (65 Be), 3 g. of sucrose and 200 mg. of sodium carbonate and homogenized. The emulsion obtained is further processed to a viscous syrup by the procedure of Example 4.

EXAMPLE 6

300 mg. of color preparation containing 15 mg. of crocetin di-n-hexadecyl ester (manufactured by the procedure given in Examples 4 or 5) are dissolved in 5 ml. of water, mixed with 1 liter of milk and processed to yogurt in conventional manner.

EXAMPLE 7

22 g. of α-bromopropionic acid dodecyl ester are added to a solution of 26 g. of triphenylphosphine in 150 ml. of benzene and the mixture is heated to 70°C. for 2 hours. After evaporating the benzene, the residue is dissolved in 200 ml. of methylene chloride and, with stirring, treated in a nitrogen atmosphere with 60 ml. of an aqueous 2N sodium methylate solution. After 30 minutes, a solution of 7.5 g. of 4,9-dimethyl-dodeca-2,4,6,8, 10-pentaene-1,12-dial ($C_{14}$-ene-dialdehyde) in 100 ml. of methylene chloride and the reaction mixture is boiled for 5 hours. It is cooled to room temperature and the methylene chloride layer washed with water. The methylene chloride solution, dried over sodium sulfate, is filtered through 300 parts by weight of Kieselgel or aluminum oxide and rinsed with methylene chloride until the filtrate remains only weakly yellow colored. the filtrate is evaporated under reduced pressure, whereupon the product is recrystallized from n-hexane. There is obtained crocetin di-n-dodecyl ester which melts at 92°–93°C. Absorption maxima at 347, 420 and 447 mμ. $E_{1cm}^{1\%}$ = 1265, 2080 and 2125 (in n-hexane).

EXAMPLE 8

By the procedure of Example 7, crocetin di-n-decyl ester, which melts at 93°–94°C, is prepared by utilizing α-bromopropionic acid n-decyl ester in place of α-bromopropionic acid n-dodecyl ester.

By the procedure of Example 7, crocetin di-n-tetradecyl ester, which melts at 91°–92°C, is prepared by utilizing α-bromopropionic acid n-tetradecyl ester in place of α-bromopropionic acid n-dodecyl ester.

By the procedure of Example 7, crocetin di-n-hexadecyl ester, which melts at 90°C, is prepared by utilizing α-bromopropionoic acid n-hexadecyl ester in place of α-bromopropionic acid n-dodecyl ester.

We claim:

1. A water dispersible coloring composition comprising as a coloring agent crocetin di-n-dodecyl ester, an edible emulsifier selected from the group consisting of stearyl lactate, palmitoyl ascorbate, stearyl ascorbate and myristyl ascorbate, and a swellable colloid selected from the group consisting of gelatin, dextrin, gum arabic, sugar fatty acid esters or mixtures thereof.

* * * * *